United States Patent [19]

Fantone et al.

[11] Patent Number: 5,544,741

[45] Date of Patent: Aug. 13, 1996

[54] FLAT BOX SYSTEM WITH EDGE VIEW OPTICS

[75] Inventors: Stephen D. Fantone, Lynnfield, Mass.; Anthony L. Gelardi, Cape Porpoise; John A. Gelardi, Kennebunkport, both of Me.

[73] Assignee: Insight, Inc., Lynnfield, Mass.

[21] Appl. No.: 221,837

[22] Filed: Apr. 1, 1994

[51] Int. Cl.$^6$ .................................................. B65D 85/57
[52] U.S. Cl. .................. 206/308.1; 206/309; 206/459.5
[58] Field of Search ............................. 206/308.1, 308.3, 206/309, 310, 311, 312, 313, 45.31, 45.34, 459.5; 220/602, 662, 665

[56] References Cited

U.S. PATENT DOCUMENTS

| | | | |
|---|---|---|---|
| 3,647,284 | 3/1972 | Elings et al. | 359/858 |
| 4,044,889 | 8/1977 | Orentreich et al. | |
| 4,828,341 | 5/1989 | Bohnet et al. | 312/9.11 |
| 4,863,026 | 9/1989 | Perkowski. | |
| 4,869,946 | 9/1989 | Clay | 428/167 |
| 5,133,451 | 7/1992 | Boyd et al. | 206/810 |
| 5,189,531 | 2/1993 | Palmer et al. | |
| 5,244,084 | 9/1993 | Chan | 206/309 |
| 5,280,385 | 1/1994 | Wybrow | 359/438 |
| 5,366,073 | 10/1994 | Turrentine et al. | 206/309 |

FOREIGN PATENT DOCUMENTS 2222143  2/1990  United Kingdom.

*Primary Examiner*—Paul T. Sewell
*Assistant Examiner*—Tara Laster
*Attorney, Agent, or Firm*—Francis J. Caufield

[57] ABSTRACT

Optical arrangements are provided by which information about the contents of flat containers and display boxes, such as compact disc (CD) jewel boxes, that is carried on or near the surfaces its flat panels, can be observed by looking at or through its narrow edges. Preferred arrangements include one or more prisms or diffractive optical elements that are snapped to or molded with existing structure to provide folded optical paths between the viewer and the interior information to provide views of information that is located in planes that are at angles to an observer's natural line of sight.

5 Claims, 13 Drawing Sheets

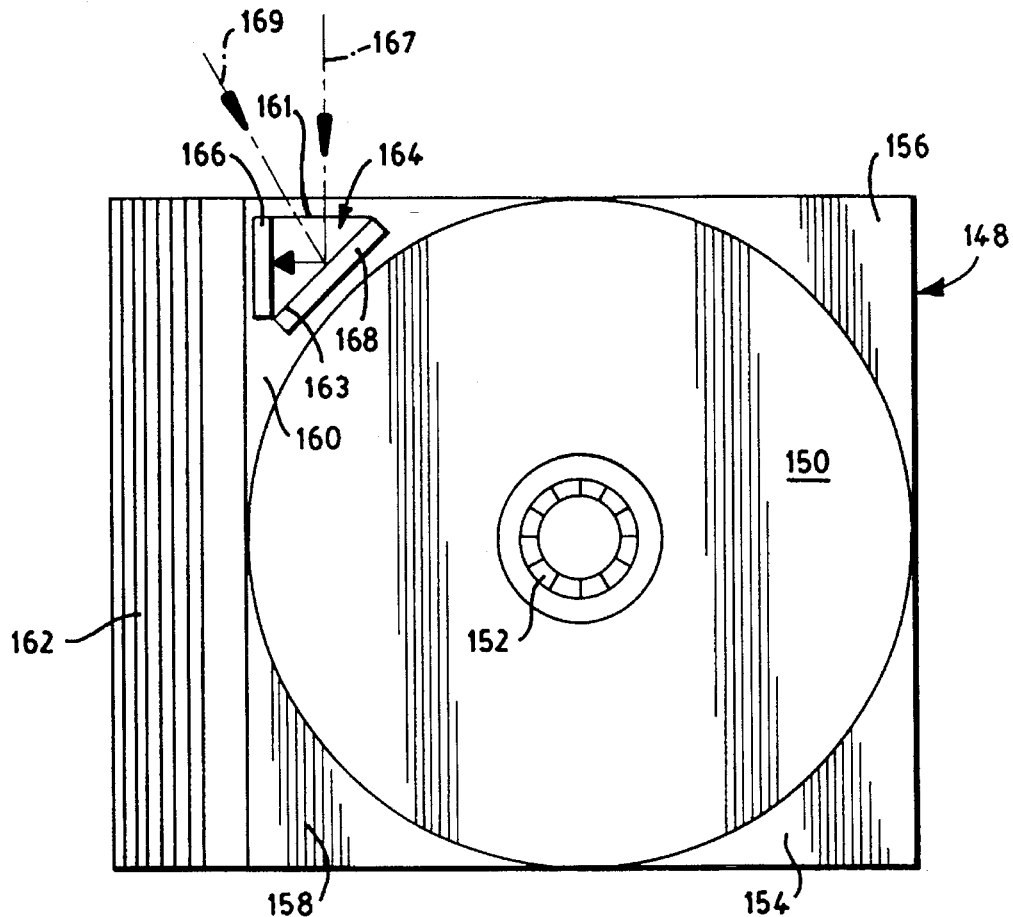
FIG. 9
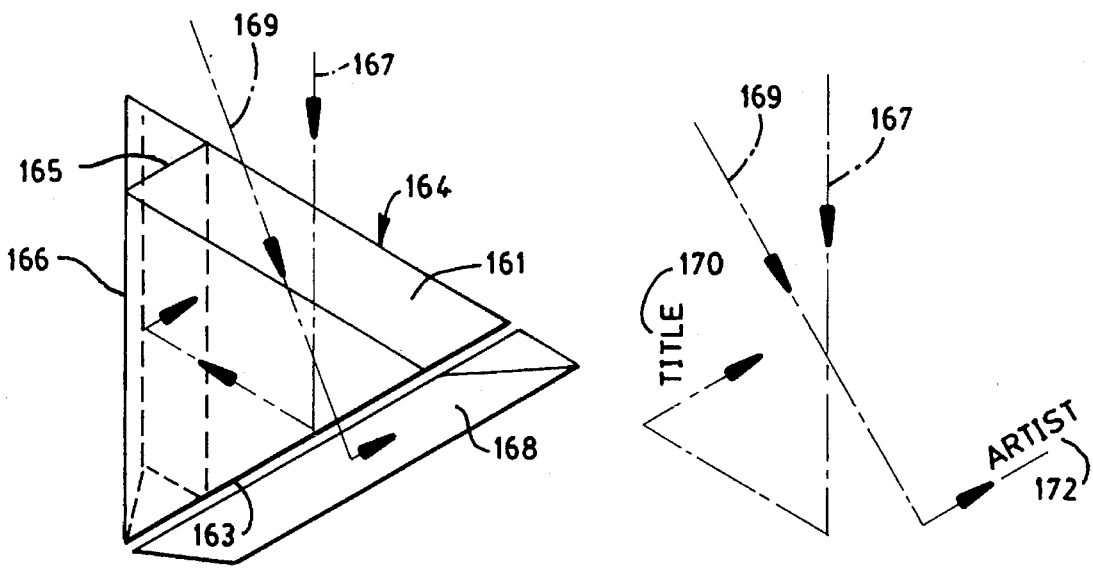
FIG. 10
FIG. 11

FLAT BOX SYSTEM WITH EDGE VIEW OPTICS

BACKGROUND OF THE INVENTION

1. Field of the Invention

This invention relates generally to flat storage and display boxes and, more particularly, to optical arrangements for providing enhanced viewing of textual, graphic, and/or other symbolically coded information located on the inside of flat, transparent storage and display boxes for compact discs or the like.

2. Description of the Prior Art

Compact discs, which were first developed by Philips and Sony in the early 1980s, are now a well-established form of medium for recording a variety of retrievable information. Their popularity and success stem from their compactness, convenience, competitive cost, and high information storing capacity.

Physically, such discs are thin, flat, circular objects. Audio versions are approximately 12 cm in diameter by about 1.2 mm thick while other forms range in diameter from about 7.5 cm. to 30.5 cm. They are provided with a central hole about 18 mm in diameter for purposes of mounting them for rotation in various devices capable of reading and writing information to and from them. Typically, audio, video or other data is recorded in digital form on one surface of the disc with the opposite remaining free for carrying information about the contents of the recorded information.

For enabling writing and recording information, a compact disc (CD) comprises a clear plastic layer over a reflective aluminum surface. Data of whatever type is stored on the disc in binary code in the form of reflective dents or pits in the plastic surface. When playing the disc, a laser beam scans the disc surface as it rotates and is reflected back to be read in accordance with the adopted encoding scheme. Reflected light pulses are picked up by a photodetector which converts them into a digital electrical signal that can then be further processed for subsequent use in various playback devices appropriate for the type of information recorded in the disc.

While very popular for audio recording, CDs also can be used for storing video information, which applies the same technology. These have advantages over magnetic tape by virtue of being easier to replicate and randomly access.

CDs are also used to store large amounts of computer information. Here, CD-ROM (compact disc with read-only memory) is the most common format, but other forms of disc are available that allow data to be written on the disc as well as read.

Recent applications for CD use include the photo-CD, which records still images for viewing on a television screen or reproduction as hard copy, and the multimedia CD, which holds pictures, sound, and text on one disc and can play them back through television receiver and hi-fi equipment or appropriately configured computer systems.

While CDs are physically robust because information is digitally encoded and optically read, they obviously are not immune to damage and require protection from mishandling and environmental effects which could destroy or compromise their information bearing surfaces or otherwise threaten their physical integrity.

Consequently, CDs are usually shipped, stored and marketed in correspondingly flat containers referred to as "jewel boxes". Such boxes are generally made of a transparent plastic such as styrene and have been designed to occupy the minimal amount of space consistent with their protective function. As a result of this, and the fact that CDs can carry so much digitally encoded information, space available on the surfaces of the jewel box for providing information about their contents is at a premium, especially since the practice of packaging CDs with "spaghetti" boxes has been discontinued because of environmental pressures associated with the accumulated waste from the sale of large volumes of CDs.

Since the disappearance of the spaghetti box from the marketplace, the current technique for informing CD users about the contents of recorded CD information is to provide the information in the form of thin paper booklets or sheets that are visible through the flat, transparent panels of a jewel boxes' front cover or base or both. In addition, use is also made of the hinge edge of a box for displaying cryptic information about the title and author or artist of the CD. However, none of these approaches are terribly effective in marketing CDs because of the physical arrangements that have been adopted by retailers in displaying them. Typically, CD jewel boxes are stacked on display with their hinge edge completely obscured from the observers view. This forces a prospective buyer to flip through stacks of CDs while scanning the front covers in search of the identity of a particular CD that may be of interest. Studies have shown that this results in the loss of multiple, and perhaps primary, sales because the process is time consuming and frustrating for the consumer. Hence, there is a need for a solution to the foregoing problems, and it is a primary object of this invention to provide solutions through the use optical arrangements which enhance the viewing opportunities and amount of information that can be visually detected by a CD user.

While optical approaches have been used in the past for direct magnification of content information provided on the inside of jewel boxes, none have provided more visual access to more viewable area than would otherwise be available without magnification or, more importantly, different information bearing viewable areas. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES" issued on Sep. 5, 1989 discloses a Fresnel lens incorporated in or on the front cover panel of a case for purposes of magnifying information carried on the surface of a program card inserted in the case such that it lies directly beneath the lens. In like manner, U.S. Pat. No. 4,044,889 entitled "COSMETIC CONTAINER INCLUDING INTEGRATED LENS STRUCTURE" issued on Aug. 30, 1977 also shows a Fresnel lens for magnifying tiny underlying information carded on the interior of a cosmetic container.

In view of the known art, there continues to be a demonstrable need for more effective ways of providing significantly improved visual access to flat containers and display boxes for purposes of informing prospective users about the contents of the containers and for making their contents more attractive to induce increased sales. And, it is a primary object of this invention to fulfill this need.

Another object of the present invention is to provide optical arrangements by which the viewable surfaces of flat containers may be exploited to provide interior views of information that is not carried on those surfaces.

Yet another object of the present invention is to provide optical arrangements for looking through an edge of a flat container to observe information carried that is not carried directly behind the edge.

It is still another object of the present invention to provide optical viewing arrangements by which information carried on broad faces of a flat container can be observed by looking at or through an edge.

Another object of the invention is to provide a simple alternative to the use of additional labeling, hot stamping, or overwrapping for providing enhanced information to the CD user and consumer.

Yet another object of the present invention is to provide optical viewing arrangements for compact disc containers that can be implemented by relatively minor modification of currently existing molds for fabricating them.

Other objects of the invention will be apparent and will appear hereinafter in the following detailed description when read in connection with the drawings.

SUMMARY OF THE INVENTION

Optical arrangements are provided by which users, consumers, manufacturers, and marketers of flat objects can be provided with more visual opportunities than currently available for learning about such objects when viewing their containers and display boxes, e.g., compact disc (CD) jewel boxes.

All of the inventive optical arrangements permit an observer to see information that is located on an interior surface of a flat container other than the one he is looking directly at. To achieve this, optical elements are arranged to provide folded optical paths between an observer's initial line of sight and the ultimate location of the information. Exemplary arrangements include one or more prisms or diffractive optical elements that are snapped to, or preferably molded with, existing structural elements to provide the needed folded observation paths.

In preferred forms, the flat containers comprise a front cover that is hinged to a base via pivots such that the two can be moved between an opened and closed position in which they are latched together to enclose one or more flat objects. Both the front cover and base are preferably molded of a transparent plastic such as styrene and include raised, shallow vertical edges which overlap one another when the front cover and base are in the closed position where they nest to define the interior space available for storage.

Textual, graphical, or coded information about the contents of the container is preferably carried on inserts registered with the flat panels of the front cover and base.

The prisms or diffractive optical elements are preferably molded into the edges of either the front cover or base to provide the folded observation paths.

In one preferred embodiment, prisms are molded in the edges of the front cover so that they also function to retain informational inserts in registration with the entrance facets of the prisms.

In another preferred embodiment, prisms are either snap-fitted to or integrally molded with a transparent compact disk holder or tray which fits into a box.

In addition to providing folded observation paths to interior information, the optical arrangements also allow ambient light to enter the interior of containers to supplement whatever other illumination is present to provide sufficient illumination for observation.

In multiple prism embodiments, multiple observation paths at different viewing angles are provided so that different information can be observed along the different paths. In addition, the embodiments employing diffractive elements may be arranged so the color coded information may be made available along differently oriented observation paths through the same observed surface.

DESCRIPTION OF THE DRAWINGS

The structure and operation of the invention, together with other objects and advantages thereof, may best be understood by reading the detailed description in connection with the drawings in which unique reference numerals have been used throughout for each part and wherein:

FIG. 9 is a diagrammatic, plan view of another embodiment of the invention in which a plurality of prisms are arranged to provide two observations paths along lines of sights that are angularly separated in a plane substantially parallel with the major surfaces of a container, the prisms being carried on the container disk tray or holder that inserts between its front cover and base to retain a CD;

FIG. 10 is an enlarged perspective view of the prism arrangement of FIG. 9;

FIG. 11 is a diagrammatic perspective view illustrating the two folded optical axes of the two folded observation paths achieved through the use of the prism arrangement of FIGS. 9 and 10;

BACKGROUND

Figure 1:
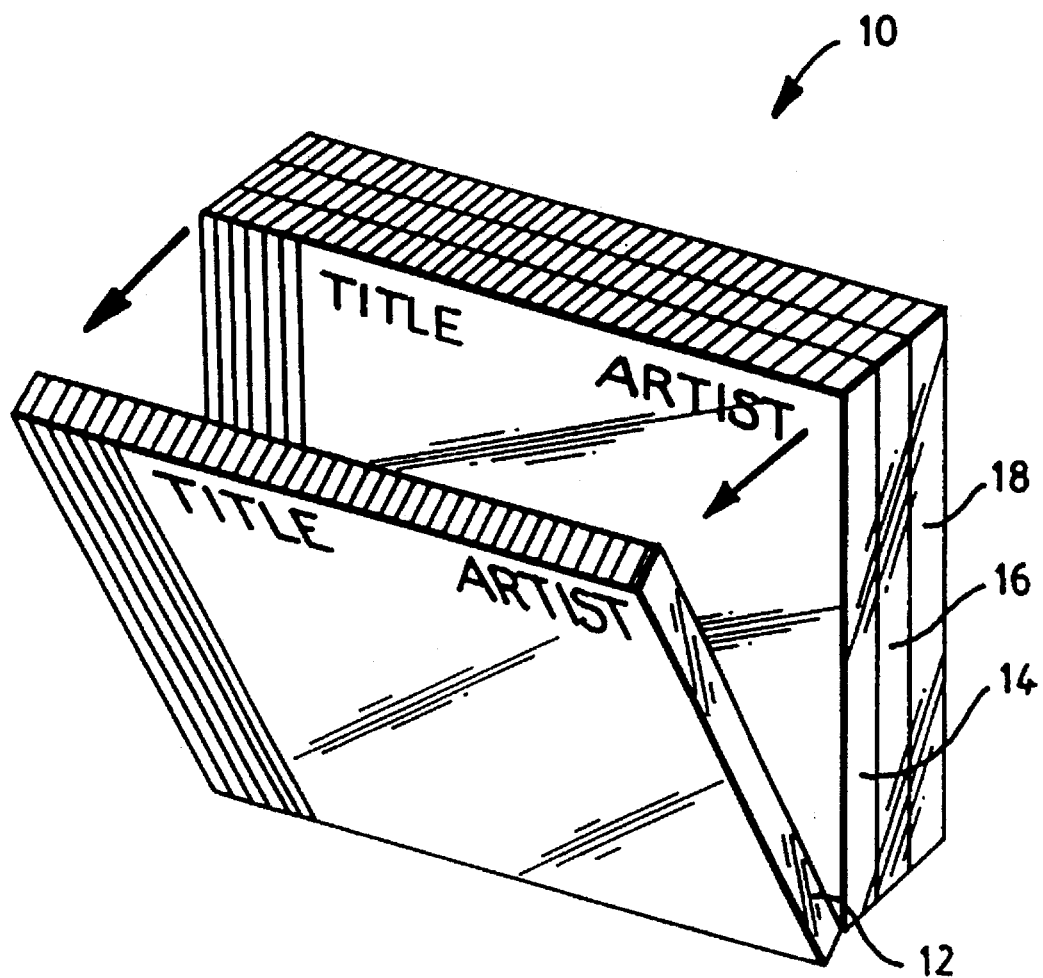
FIG. 1 is a diagrammatic perspective view of a plurality of conventional CD jewel boxes stacked to illustrate the identification problem a consumer usually encounters during the buying process.

Reference is now made to FIG. 1 which shows a stack of flat storage and display box systems for compact discs. The stack is generally designated at 10 and comprises a plurality of individual boxes 12, 14, 16, and 18, which are all identical and of conventional design for storing and displaying compact discs (CDs) such as those for recording and playing back audio information. However, it will be understood that other forms of information such as data, video, multimedia, or graphics could just as easily be recorded on such CDs.

Figure 2:
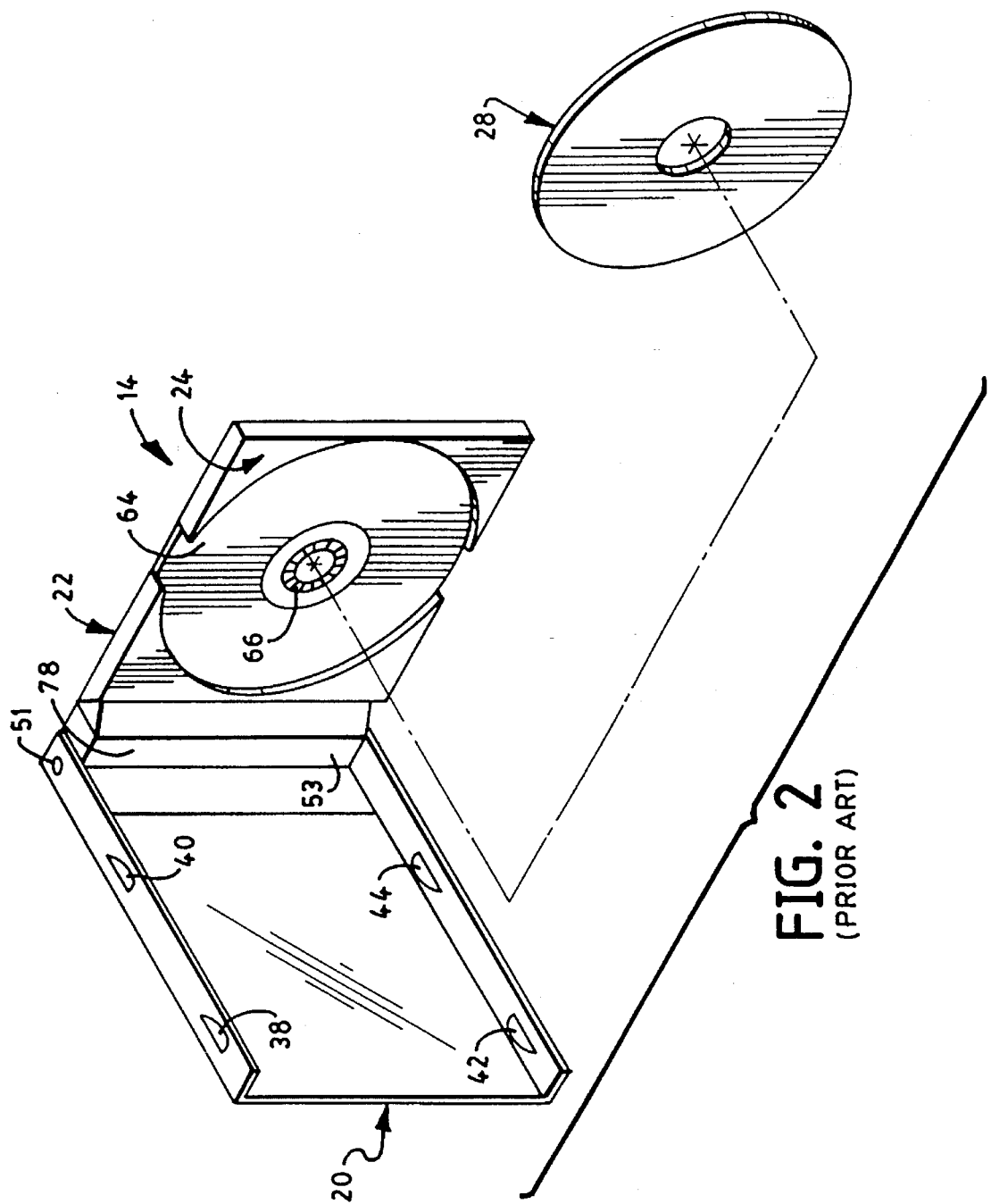
FIG. 2 is a diagrammatic perspective view of a conventional CD jewel box shown in its opened position along with a compact disc.
Figure 3:
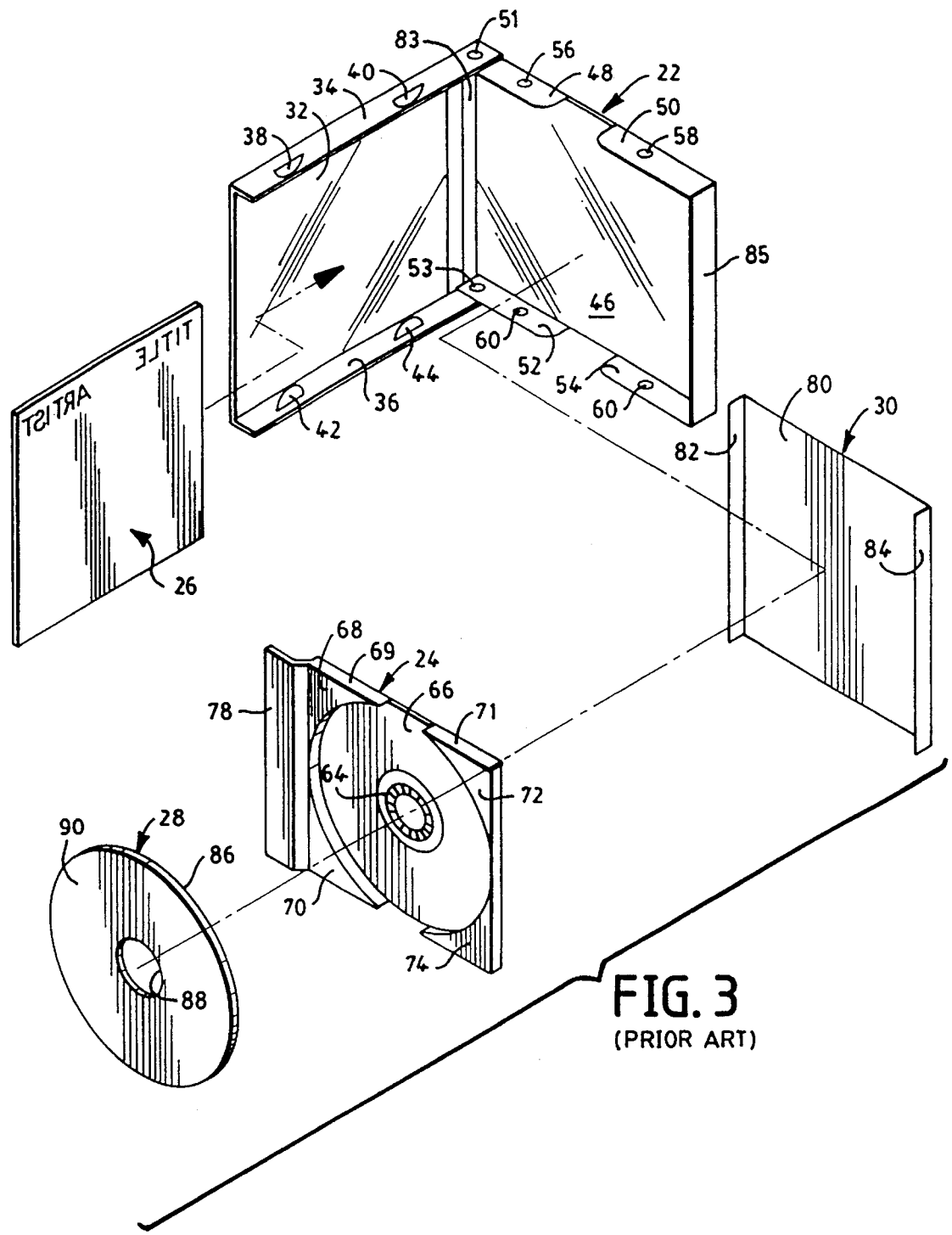
FIG. 3 is an exploded diagrammatic perspective view of a conventional CD jewel box and its various contents including a CD, program insert, and base insert with folded edges.

As best seen in FIGS. 2 and 3, each compact disc box system, considering box 14 as exemplary, comprises the following major components: a front cover 20, a rear base 22, a compact disc carrier or holder 24, an informational booklet 26, which typically carries printed graphical and textual information describing the recorded contents of the box, a compact disc 28 which bears recorded information, and a folded printed insert card 30, which typically carries a shortened textual and graphic description of the contents of the recorded information.

Front cover 20, rear base 22, and disc holder 24 are all molded of a suitable plastic by injection molding with a wall thickness of about 1.2 min. Overall, each box measures about 142 mm×124 mm×10.4 mm as pictured in FIG. 1 in their closed state.

Typically, front cover 20 and rear base 22 are transparent and molded of styrene or polycarbonate, while disc holder 24 may be made of either transparent or opaque plastic colored as desired.

Referring now to FIG. 3, it can be seen that front cover 20 comprises a front flat panel 32 which has upper and lower raised edges 34 and 36, respectively. Upper raised edge 34 has a pair of spaced apart tabs, 38 and 40, extending outwardly therefrom while lower raised edge 36 is provided with a similar pair of tabs, 42, and 44. Tabs, 38 to 44, are configured and arranged to have corresponding edges of booklet 26 slide underneath them to retain it with its front surface against the rear surface of transparent front cover panel 32. In this manner, information carried on the front page of booklet 26, such as the title and artist's name for an audio disc, can be clearly seen through the front surface of front cover 20.

Rear base 22 also has a transparent flat panel that is designated as 46. Extending outwardly from flat panel 46 are a plurality of raised edge sections 48, 50, 52, and 54. Raised edge sections, 48 and 52, are provided with shallow circularly symmetric holes that cooperate with short complementarily configured posts on the back end of front cover upper and lower edge, 34 and 36, respectively, to provide a pair of pivots, 51 and 53, respectively. Pivots, 51 and 53, permit front cover 20 and rear base 22 to be hingedly connected to one another for movement between open and closed positions.

Folded insert 30 comprises a flat panel section 80 and two raised end edges 82 and 84, all of which can carry printed textual or graphical information. Typically, edges 82 and 84 carry just textual information.

During the assembly of a typical box storage and display system, insert 30 is usually automatically placed in rear base 22 with its information bearing section 80 against the rear surface of transparent flat panel 46 so that it can be readily perceived from the opposite surface by a CD user or customer.

In this connection, the information carried on raised edges 82 and 84 can be seen, respectively, through left and fight edges, 83 and 85, respectively, of rear base 22. Left edge 83 in this instance corresponds to the hinge edge of a typical box system.

Compact disc holder 24 functions to retain insert card 30 flush with the rear surface of rear base fiat panel 46 and to retain a compact disc in place. For these purposes, disc holder 24 comprises a circular tray section 64 with a flexible hub 66. Extending above circular tray section 64 are four raised edge sections, 68, 70, 72, and 74, located at the four comers of disc holder 24 and shaped to provide a rim for protecting the peripheral edges of a compact disc.

Each raised edge section, 68–72, includes raised dimples (only two shown), such as those at 69 and 71, that are adapted to be snap-fitted with corresponding tab section detent holes, 56–62, in rear base 22. In this manner disc holder 24 snaps into and is retained in rear base 22.

Compact disc 28 is seen to be a fiat circular object with a front surface 86, rear surface 90, and central circular mounting hole 88. Front surface 86 carries recorded information with rear surface 90 typically carrying printed information identifying the CD recorded contents by title and artist or the like.

CD 28 is held in place by disc holder 24 with its recorded information bearing surface 86 against the front surface of circular tray 64 so that it is protected against damage. To accomplish this, a user simply aligns flexible hub 66 with circular hole 88 and then pushes against compact disc 28 until it compresses the flexible fingers of hub 66 inwardly. Further inward pressure causes the flexible fingers by design to expand after certain portions clear the thickness of a CD to trap disc 28 in place.

Disc holder 24 also includes a rectangularly shaped raised deck 78 that protrudes through front cover 20 near the hinge edge. The deck is usually provided with surface serrations extending along its longitudinal direction to provide a grip for ease of handling by the user and during manufacture.

In the assembled state as shown in FIG. 1, the information beating surfaces in such compact disc storage and display box systems can usually only be seen by flipping through them in the manner illustrated. Because of the display arrangements adopted by retailers, it is typically only possible to flip through boxes to scan the information appearing through their front covers to identify their contents. No information can be seen through either top or bottom edges in the position in which they are usually displayed, and the information that might be seen through the hinge or right edge of a box system is also obscured in this display position.

As will be seen in the following description, the foregoing problems with the conventional CD storage and display box systems are solved with novel optical arrangements for providing a user or customer with more and different opportunities for observing information about the contents of CDs.

DETAILED DESCRIPTION

Figure 4:
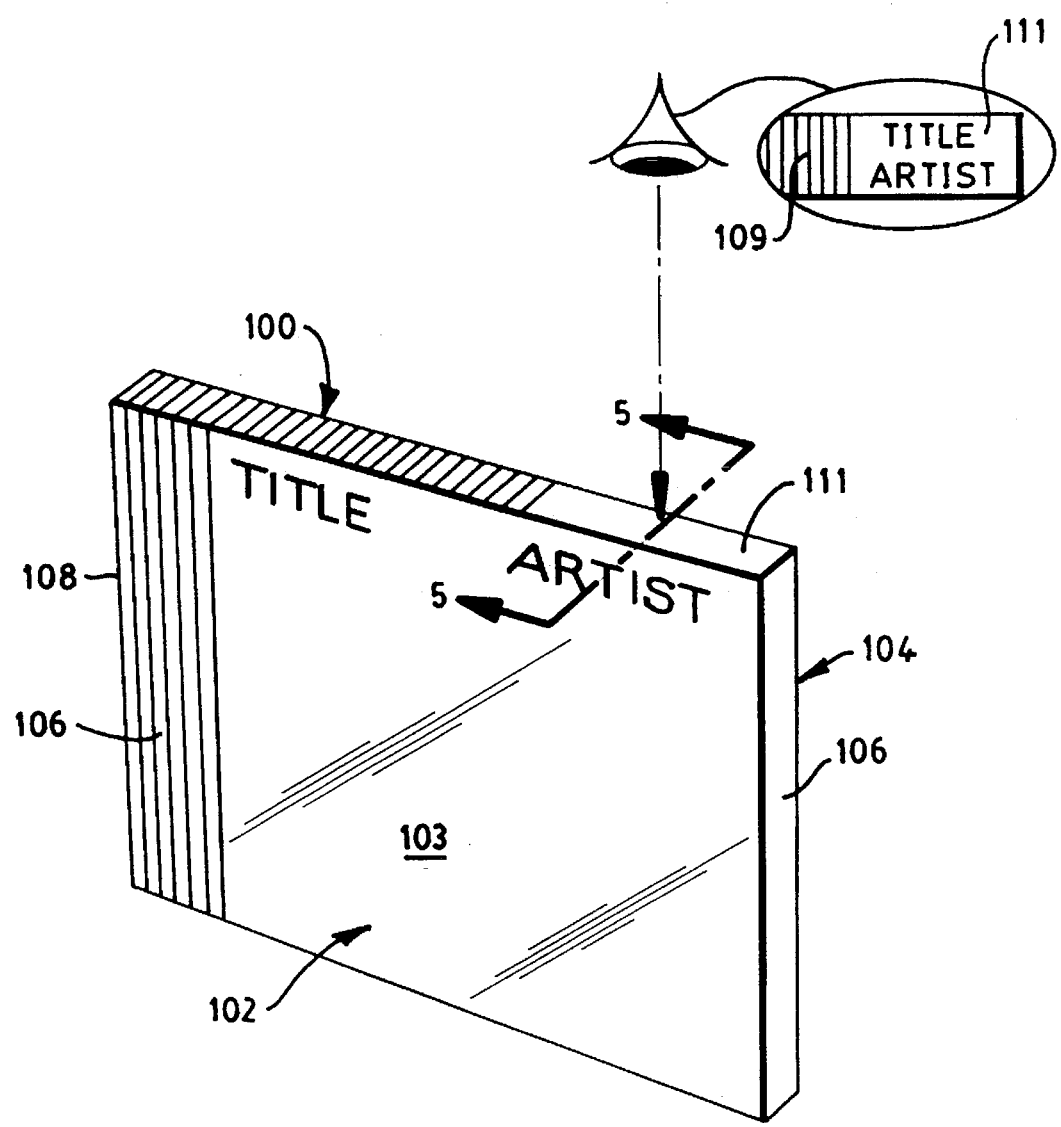
FIG. 4 is a diagrammatic perspective of an inventive container for a CD showing the informational view presented to an observer looking directly down at its upper right hand corner as he would in a retail environment.

Referring now to FIG. 4, there is shown at 100 a compact disc storage and display box system that incorporates a preferred inventive optical arrangement for providing enhanced observing opportunities of information about its contents compared with those available with the conventional box systems previously discussed above. In other respects, however, the noninventive features of box system 100 are similar to those of conventional designs, thus making box system 100 readily adaptable to the use of existing molds, modified appropriately, for incorporating the inventive features to be described.

As with conventional designs, box system 100 comprises a transparent front cover 102, a back base 104 with a right side edge 106, and an interior compact disc (not shown in its entirety) having a serrated deck 106 that sticks through front cover 102 near the box hinge edge, designated as 108. Behind front cover 102 is a booklet 103 that carries information about the CD to be stored in box system 100, and this information may be about the title and/or artist or similar information. The information may also be in textual or graphical form or may be coded as in bar code format.

Front cover 102, rear base 104 and the compact disc holder of box system 100 are all preferably molded of styrene having an index of refraction of approximately 1.59. However, as will be recognized by those skilled in the art other suitable plastics such as polycarbonate or the like may also be used to practice the invention.

Box system 100 is quite different from conventional designs because a user or potential purchaser can directly see title and/or artist information or the like by directly observing its an upper raised edge 109 of front cover 102. As can be seen, raised edge 109 includes a transparent window 111 where the title and artist information appears to the user. In this and other embodiments to be described, it will be understood that the transparent window 111, or subsequent windows, may be a cutout with optical elements following downstream, a section of flat, transparent plastic that can be seen through, or an input facet to an optical element. How this is achieved is best understood with reference to the cross-sectional view of FIG. 5.

Figure 5:
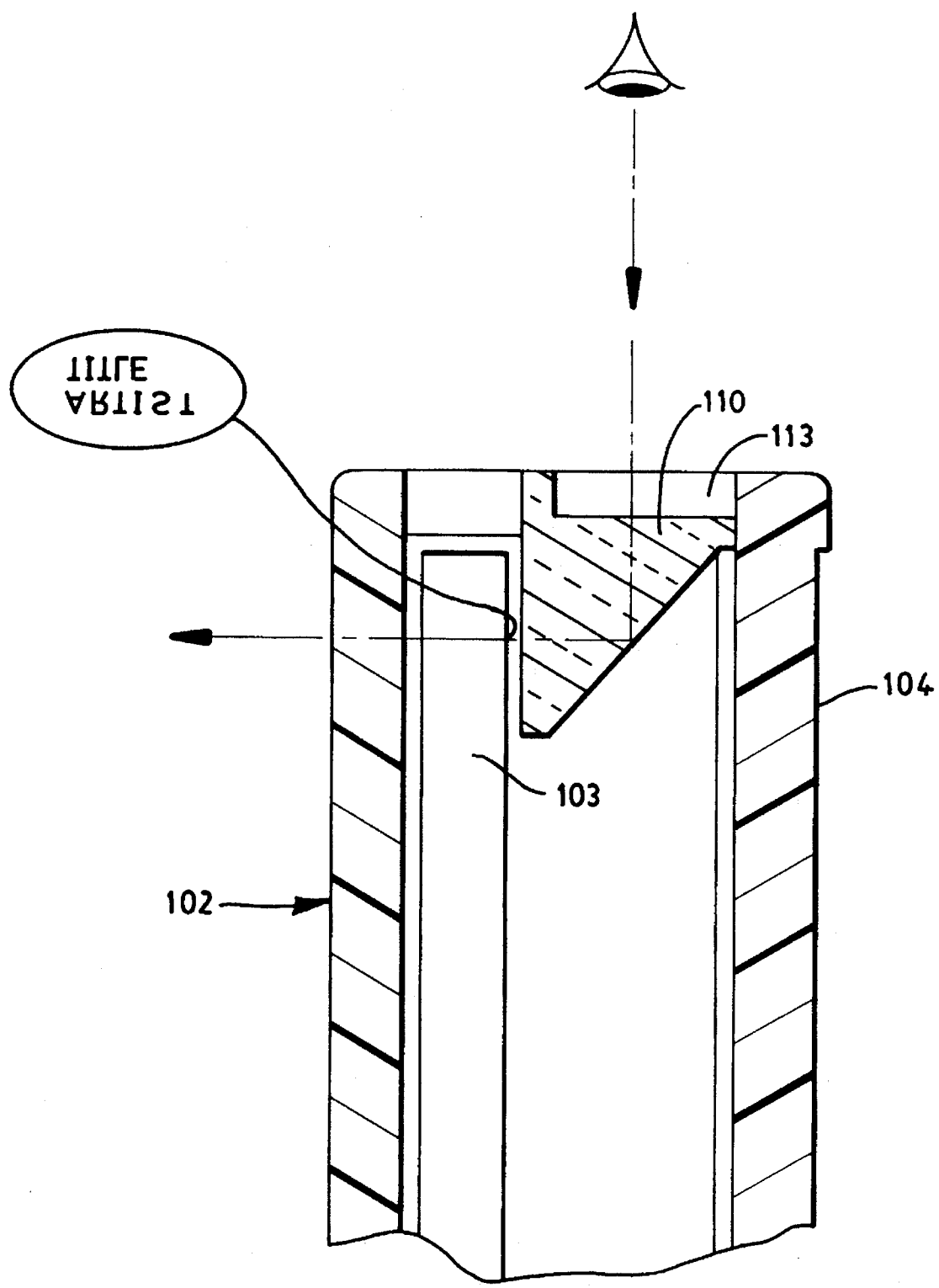
FIG. 5 is an enlarged, diagrammatic cross-sectional view of a portion of the container of FIG. 4 taken generally along line 5—5 thereof.

As shown in FIG. 5, upper edge 109 of front cover 102 has integrally molded with it a prism section 110 that operates by total internal reflection to provide a folded optical path of observation between window 111 and the back, upper edge surface of booklet 103, which is held in place in registration with front cover 102. In this connection, the front surface of prism 10 serves the same function as that provided by tab sections, 38–44, of the conventional designs previously discussed.

On the back upper edge of booklet 103 is printed in inverted fashion the title and artist information because of the image inversion caused by prism 110.

To accommodate prism 110, back cover 104 is appropriately modified with a cutout section 113.

Prism 110 may be formed by modifying existing molds by hogging out metal from the mold for the front cover as needed, and cutout 113 for rear base 104 can readily be provided by the addition of mold material to the existing tab sections.

As will be readily appreciated, prism 110 can readily be formed in any of the four corners of box system surrounding the compact disk or all of them if desired. In addition, the information observed via such prisms need not be carried on the booklet but could be carried on the prism's front facet, the facet facing the booklet, if placed there by hot stamping or the like.

In addition to providing the described folded path of observation, it will be appreciated that the inventive prism simultaneously acts to collect available ambient light and direct it onto the printed message to illuminate it to that it can be seen by a human observer or by a photodetector in the case where the information is a bar code used in carrying out manufacturing steps.

Figure 6:
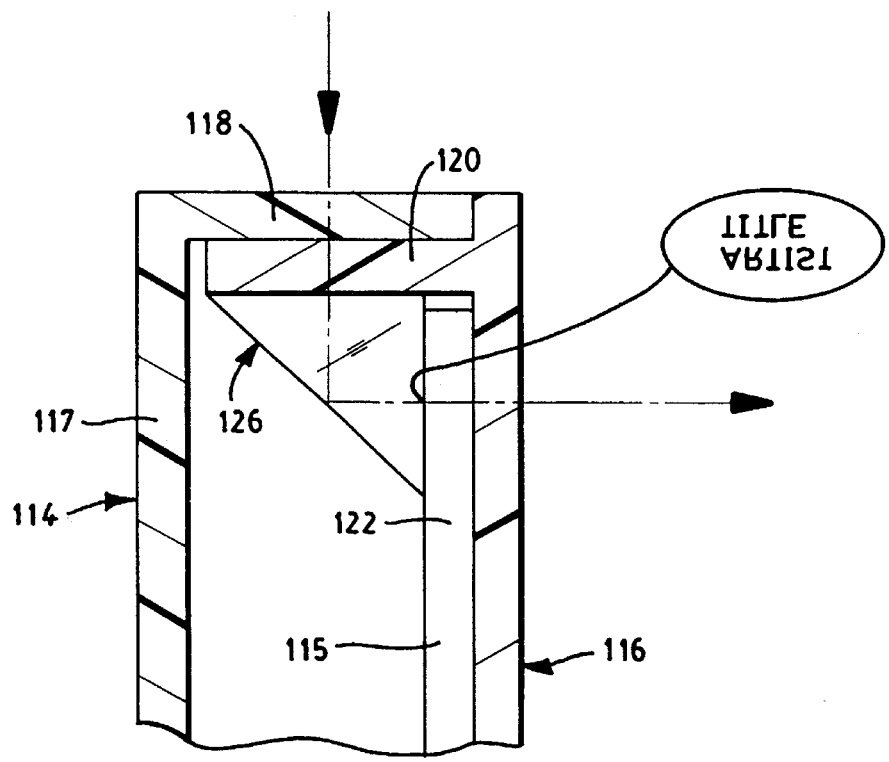
FIG. 6 is an enlarged, diagrammatic vertical cross-sectional view of a portion of an alternate embodiment of the invention.

FIG. 6 shows another embodiment of the invention. Here, the compact disc box system comprises a front cover 114, a compact disc holder 115, and a rear base 116. Front cover 114 includes a raised edge 118 that overlaps a complementary configured raised edge 120 in rear base 116 to provide a nesting arrangement. Trapped between rear surface of compact disk holder 115 and the front surface of rear base 116 is an insert card 122 bearing inverted title and artist information near the its upper edge as shown. To see the information, disc holder 115 is provided with a prism 115 that operates as above to provide a folded path of observation between an observer of edges 118 and 120 and the title and artist information which is in registration with the rear facet of prism 126.

Figure 7:
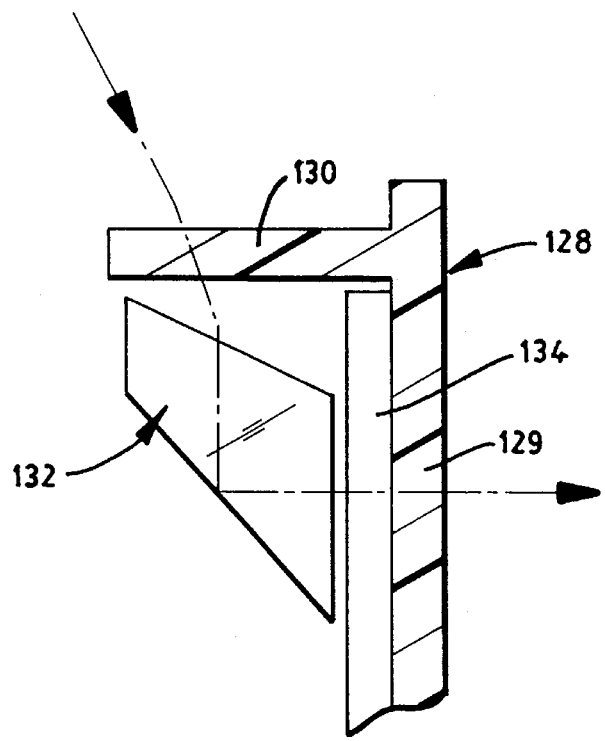
FIG. 7 is another enlarged, diagrammatic vertical cross-sectional view of a portion of yet another alternate embodiment of the invention.

FIG. 7 shows yet another prism arrangement for providing a folded path of observation between longer edges of a CD box and information carried on the corresponding outboard edges of the rear insert card. Here, rear base 128 includes a flat panel 129 having a raised edge 130. Insert card 134 is observed via a prism 132 whose input facet is tilted upwardly, clockwise compared with the prism 126 of FIG. 6, to rotate the observer's line of sight counterclockwise so that the observer does not have to look at right angles at edge 130 to see the message carried on insert 134.

Figure 8:
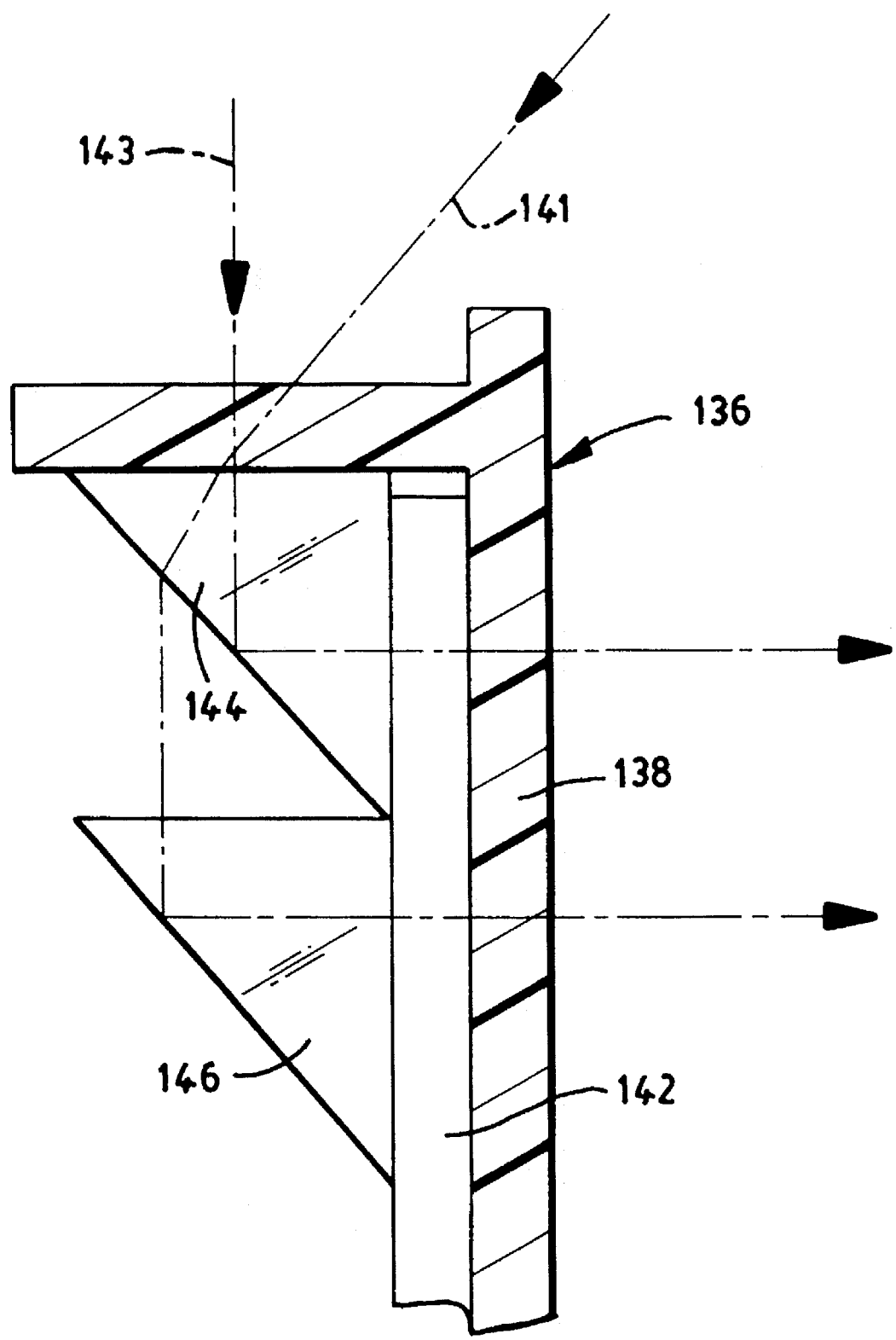
FIG. 8 is another enlarged, diagrammatic vertical cross-sectional view of a portion of still another alternate embodiment of the invention illustrating the use of multiple prisms for providing two folded observation paths that are angularly separated.

Referring now to FIG. 8, there is shown an embodiment that provides dual folded observational paths 141 and 143 that are angularly separated from one another yet allow an observer to see different information while observing the same edge surface. This embodiment comprises a rear base 136 with a flat panel 138 and raised edge 140. A pair of right prisms 144 and 146 are arranged one above the other, and both are configured in a well-known manner to operate by total internal reflection, as with previous embodiments. Information in the form of inverted text or graphics is carded on an insert card 142 with the information optically registered with the exit facets of prisms 144 and 146. Observation path 143 obtains when an observer's line of sight is normal to edge 140, and observation path 141 obtains when an observer's line of sight is off normal by a predetermined angle and is a consequence of the fact that the initial direction of sight of an observer is experiences two refractions (changes of direction) in passing through both prism 144 and prism 146.

FIG. 9 shows an embodiment of the invention that employs a plurality of prisms to provide two distinct paths of observation that are angularly separated in a plane generally parallel to the flat surfaces of a CD box system. As seen in FIG. 10, a compact disc holder 150 comprises a disc tray 150, a flexible hub 152, four generally triangular shaped corner sections, 154, 156, 158, and 160, that are raised with respect to the tray 150 to provide protection for a compact disc mounted on flexible hub 152. To the left, is a deck section that is next to the hinge of the box and stands slightly proud of a box front cover. In the upper left corner section 160 are a large shallow right prism 164 having an entrance facet 161, a totally internally reflecting facet 163, and a exit facet 165, all of which are normal to the paper as seen also in FIG. 10. Adjacent facet 163 and in optical contact with it is a cylindrical right prism 168. Similarly, a fight cylindrical prism 166 is adjacent facet 165. These prisms are arranged so that an observer looking generally along the plane of the paper at the surface of facet 161 is provided with the two angularly separated views indicated at 167 and 169. As seen in FIG. 11, observation path 167 is folded twice, first by facet 163, which directs it to prism 166, and then by prism 166, which directs it into the plane of the paper. Considering the plane of the paper to be in contact with an information bearing surface such as the card insert previously discussed, the observer can then see a message such at the one indicated at 170.

When looking along path 169, an observer's line of sight is folded only once at the totally internally reflecting facet of prism 168 where it is directed into the paper so that a message as indicated at 172 in FIG. 11 can be seen. Consequently, with this scheme, an observer can rotate his head about the edge of a box and, while doing so, see one or more messages one of which is the initial branch, the part before the fold in a folded optical path, that resides in a plane that is skewed with respect to the plane in which the initial branch of the first optical path resides, e.g., the initial branch of optical path 169 in FIG. 11 is skewed with respect to optical path 167. Obviously, all four corners could be utilized for this purpose, and the may be molded into the disc holder 148 as a unitary piece with it.

Figure 12:
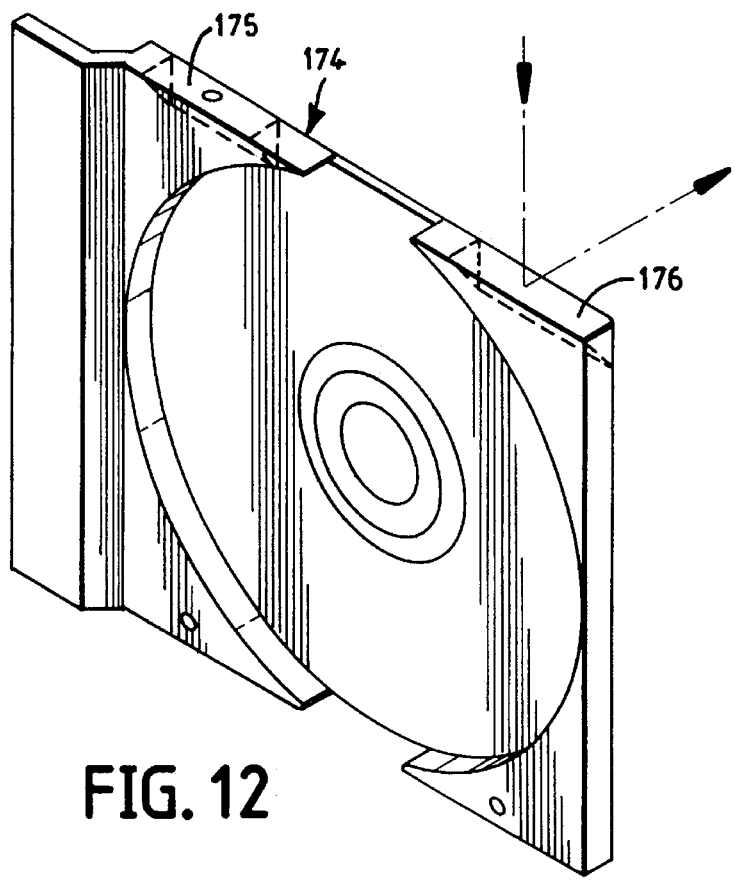
FIG. 12 is a diagrammatic perspective view of an embodiment of the invention in which a prism is molded as a unitary part of a CD container disc tray or holder.

FIG. 12 shows a compact disc box holder 174 in which a pair of spaced apart right prisms 175 and 176 are integrally molded adjacent an edge thereof to provide a pair of folded paths of observation of interior information carried on a box card insert of the type previously described when holder 174 is snapped into a box and seats against the card insert.

Because prisms 175 and 176 are form an integral part of disc holder 174, all can be molded as a unitary part with little modification of the original mold for forming conventional disc holders.

Figure 13:
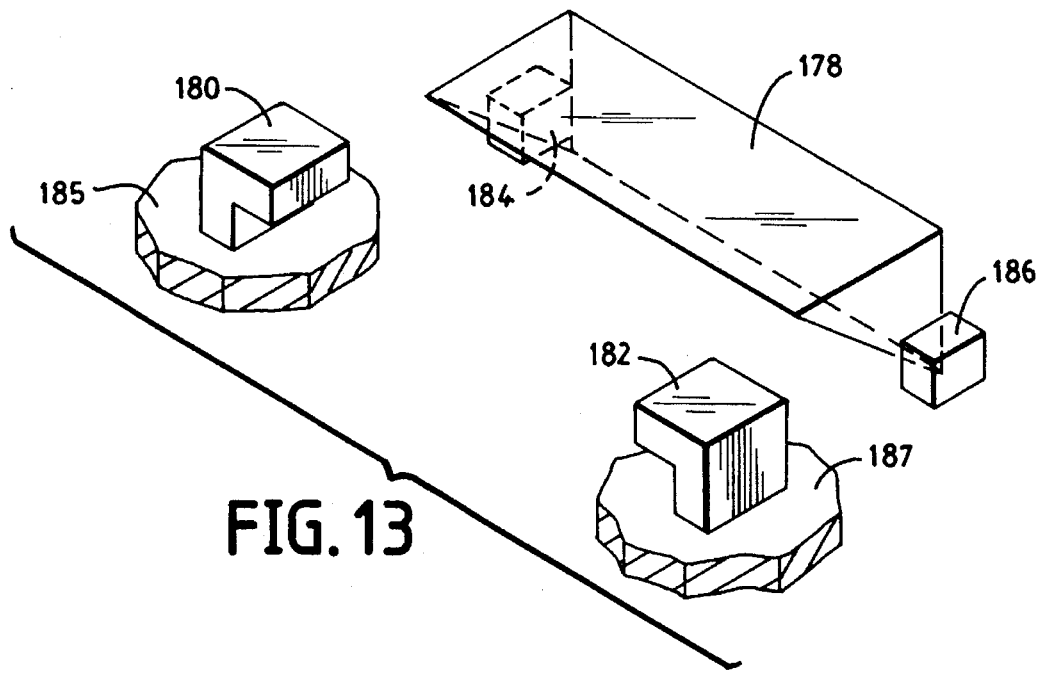
FIG. 13 is an exploded, diagrammatic perspective view of an fastening arrangement by which a prism may be snap-fitted to a container surface such as that of the tray of FIG. 12.

Another way of integrating prisms with existing compact disc box structure is to modify that structure so that it is capable of having the necessary optical elements snap fitted to it as illustrated in FIG. 13. FIG. 13 shows a prism 178 that is provided with a pair of spaced apart side bars 184 and 186. Side bars 184 and 186 are adapted to snap under a corresponding pair of spaced apart L-shaped flexible fingers, 180 and 182, respectively, that are formed into portions of existing compact disc box structure indicated generally at 185 and 187, respectively. Instead of integrally molded the optical elements needed to carry out the functions of the invention, it will be appreciated that the foregoing type of snap fit techniques may be used for retaining them in place.

Figure 14:
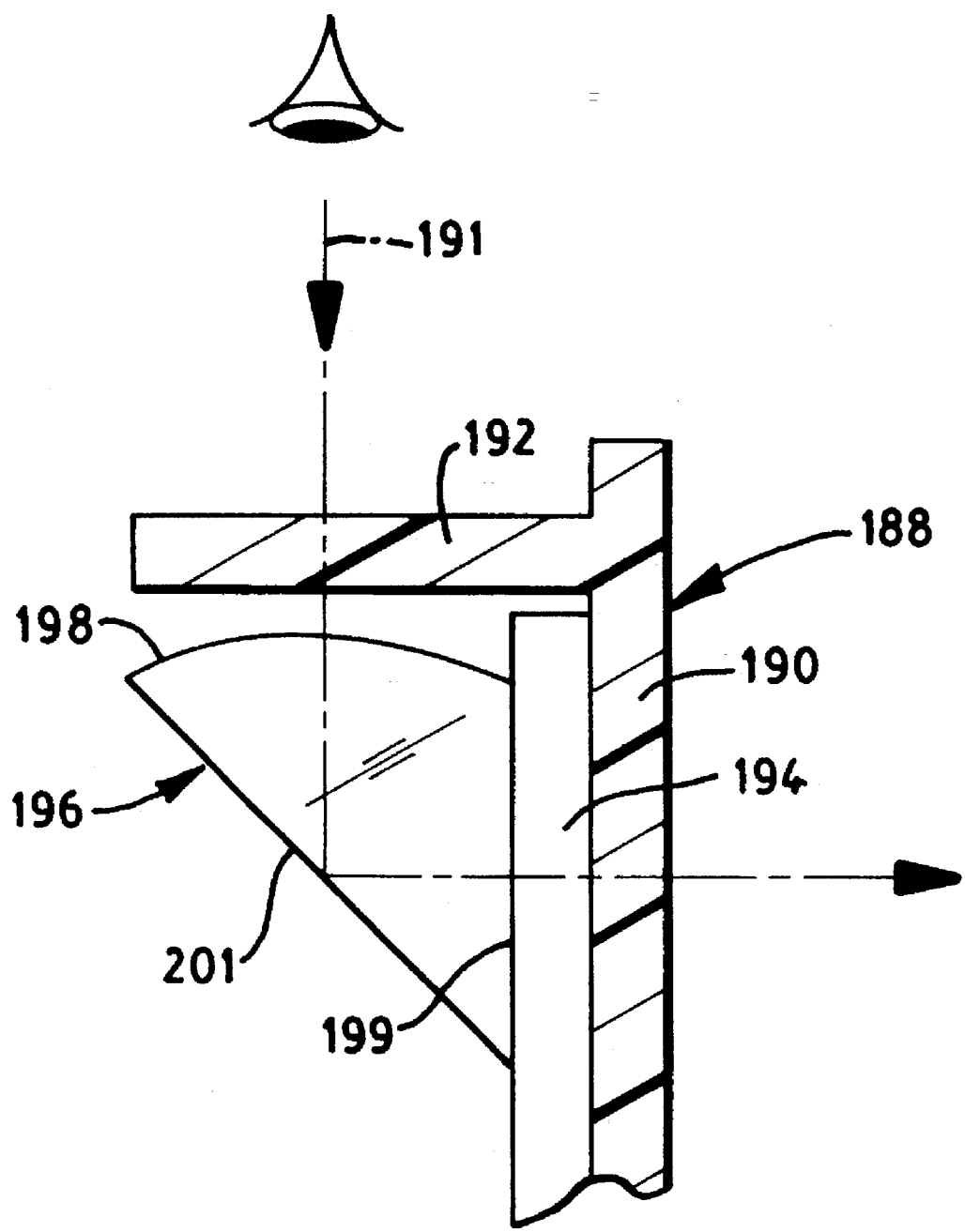
FIG. 14 is a an enlarged diagrammatic elevational cross-section of a portion of an alternate embodiment of the invention which employs magnification while provided a folded observational path to interior information.

FIG. 14 shows an embodiment where magnification is placed in the folded observation path indicated at 191. Here, there is a base 188 comprising a flat panel 190 having a raised edge 192. Again, an insert card 194 is located against the inner surface of the flat panel 190. A prism 198 is provided having a convex entrance surface 198, a totally internally reflecting surface 201, and an exit facet 199. Informational matter is placed in registration with the exit facet 199 in the usual manner. With this arrangement an enlarged view of the informational matter is provided to the observer. Consequently, more information can be provided since it can be written over a smaller area which when enlarged appears the right size. Obviously, magnification can be used in any of the previous embodiments and, as will be appreciated, in subsequent embodiments as well.

Figure 15:
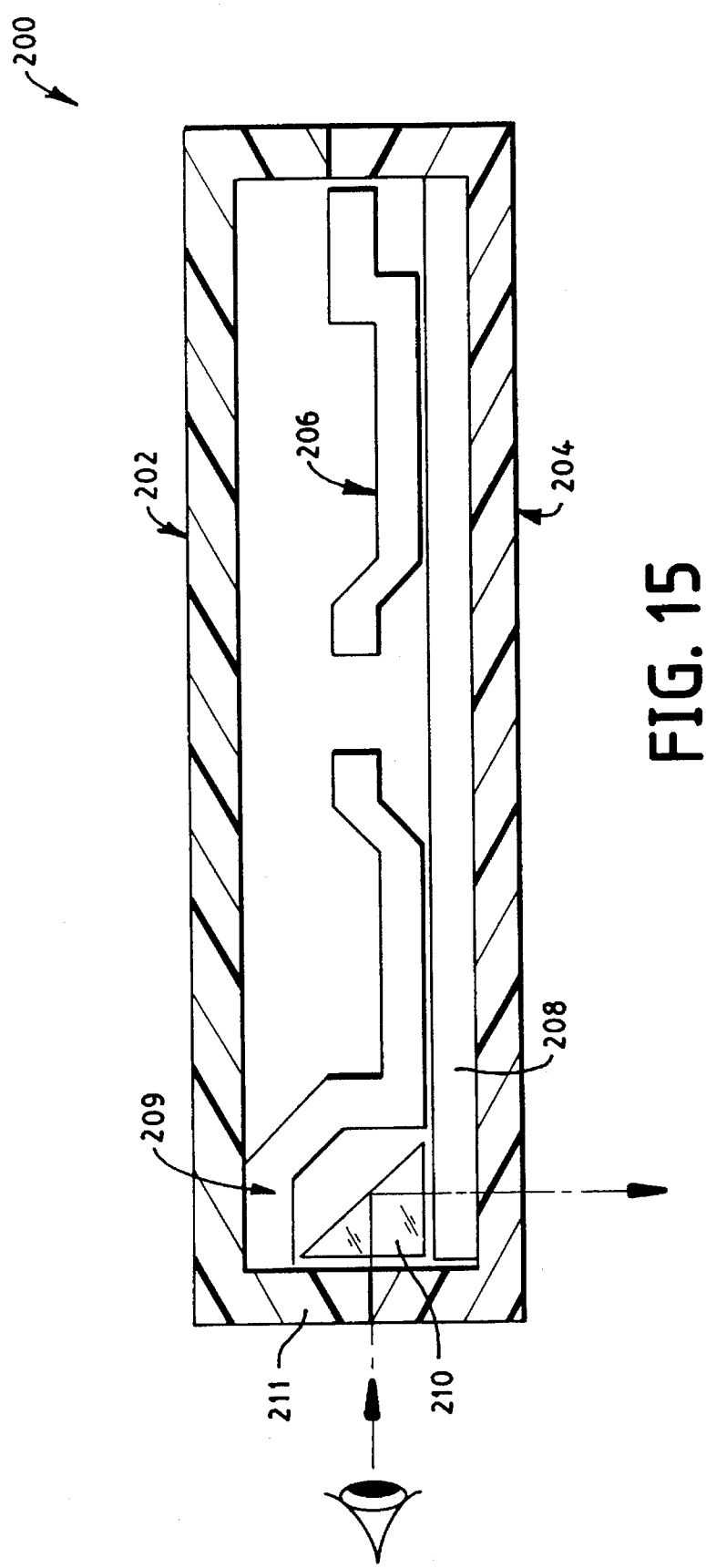
FIG. 15 is a diagrammatic cross-sectional elevational view of an alternate embodiment of the invention by which the information customarily carded on a vertical insert tab may be observed on a flat surface of the insert while dispensing with the vertical tab.

FIG. 15 illustrates how a folded observational path may be used to permit observation through the hinge edge of a compact disk box to eliminate the need for the folded vertical tabs (See 82 and 84 in FIG. 3) that are necessary for use with conventional compact disc box systems to provide hinge and front edge information. While this may not seem like a significant result, it actually is since the insert cards as currently configured are very difficult to insert via automated processes while a completely flat one would be much easier to automatically insert as part of a properly configured box system.

As seen in FIG. 15, a box system 200 comprises a front cover 202, a base 204, a compact disc holder 206 and a completely flat insert card 208 trapped against the interior surface of base 204. Located just under disc holder deck 209 is a right cylindrical prism 210 that extends the length of hinge edge 211 of the box 200. This arrangement allows a message of approximately 125 mm in length to be visible through the box hinge edge 211 without the necessity of insert folds.

Figure 16:
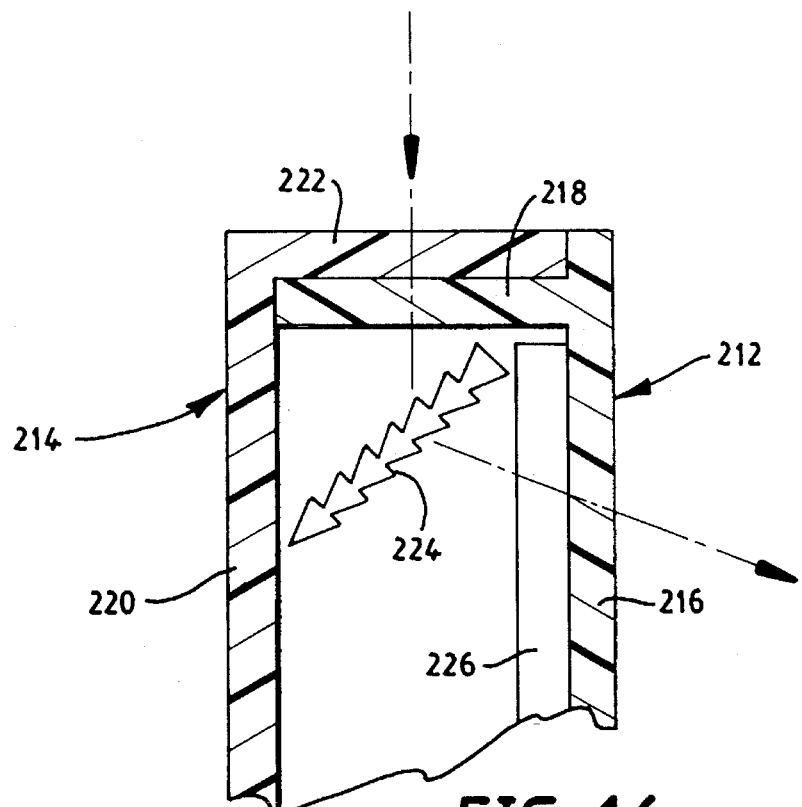
FIG. 16 is a diagrammatic cross-sectional elevational view of an alternate embodiment of the invention employing a prismatic dement in Fresnel form.

FIG. 16 shows yet another implementation of the invention. Here, the box comprises rear cover 212 having flat panel 216 and edge 218, and front cover 214 having flat panel 220 and edge 222. Insert card 226 is provided as before. Just underneath edge 218 is a Fresnel form of prism indicated at 224. Fresnel prism 224 acts substantially like its bulk counterpart except for slight visual artifacts due to the boundaries between its facets. Each element of Fresnel prism 224 acts in a well-known manner to refract a corresponding portion of a message so that the entire message appears as a whole. It should be clear that such a Fresnel prism may also be formed on any of the surfaces of raised edge 218.

Figure 17:
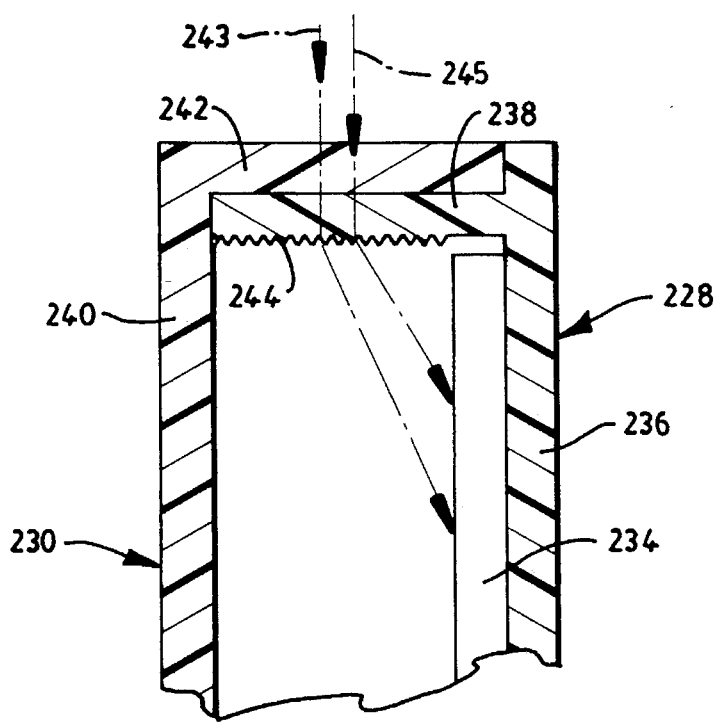
FIG. 17 is a diagrammatic cross-sectional elevational view of an yet another alternate embodiment of the invention employing a diffractive surface to provide color coded information along two angularly separated observational paths while observing the same surface.

FIG. 17 utilizes a diffractive optical (DOE) or holographic optical element (HOE) to provide folded or deviated paths of observation 243 and 245. Here, the chromatic variation in path deviation with wavelength usually associated with a DOE or HOE provides the ability to color code the information to be observed. In the illustrated embodiment, base 228 comprises a rear panel 236 with a raised edge 238. A front cover 230 comprises a flat panel 230 and raised edge 242. Insert card 234 bearing information is positioned against the interior surface of flat panel 234, registered with it as before. On the interior surface of raised edge 238 there is formed a diffractive surface 244 that consists of a series of finely detailed grooves about a micrometer in width. As is well-known such structures operate to diffract incoming light through different angles in accordance with its wavelength—the longer wavelengths being bent more that the shorter ones. Consequently, an observer looking normal to edges 242 and 238, is able to see differently colored messages at different vertical locations along insert card 234;

those portions of the message that are colored to reflect at longer wavelengths being visible further up on insert card 234 than those which reflect at shorter wavelengths. Hence, messages in red would be located closer the edges than messages coded in blue, which would be further down.

Figure 18:
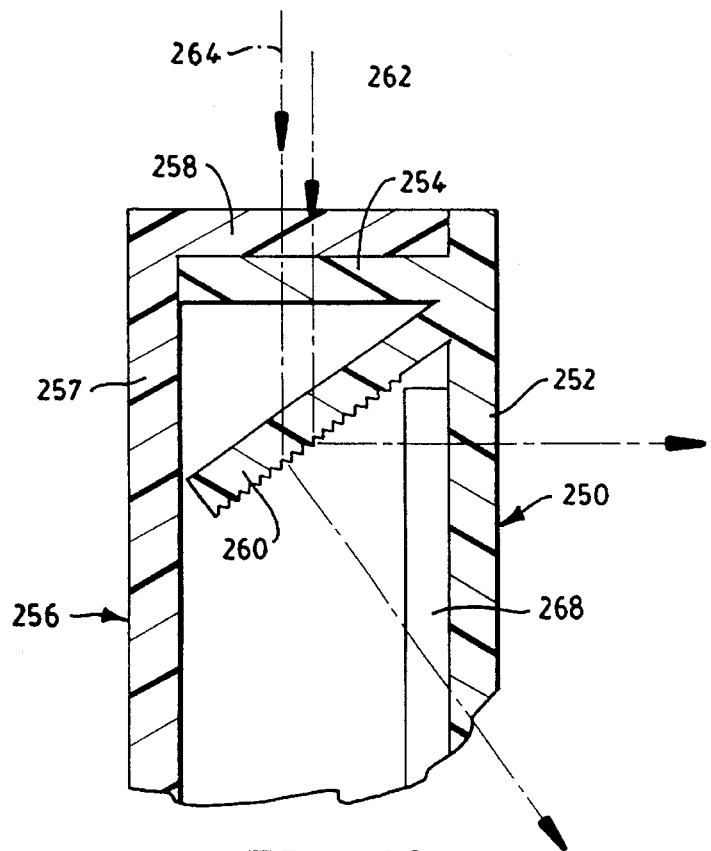
FIG. 18 is a diagrammatic cross-sectional elevational view of yet another embodiment of the use of a diffractive optical element to provide two angularly separated observational paths along which information coded in different colors can be seen while observing the same surface.

FIG. 18 is another embodiment of the invention that employs a diffractive or holographic optical element to provide color encoded information visible along a common optical path but located in a plane at an angle with respect to the line of sight of an observer. In this embodiment, a rear base 250 comprises a flat panel 252 having a raised edge 254, and a front cover 256 has a flat panel 257 having a raised edge 258. Information bearing insert card 268 is positioned as before. A diffractive or holographic optical element 260 extends between raised edge 254 and vertical flat panel 252. Element 260 is structured in a well-known manner to diffract short wavelength light to provide a first folded path of observation 262 and longer wavelength light to provide a second folded path of observation 264 with terminates further down on insert card 268 than does path 262.

Figure 19:
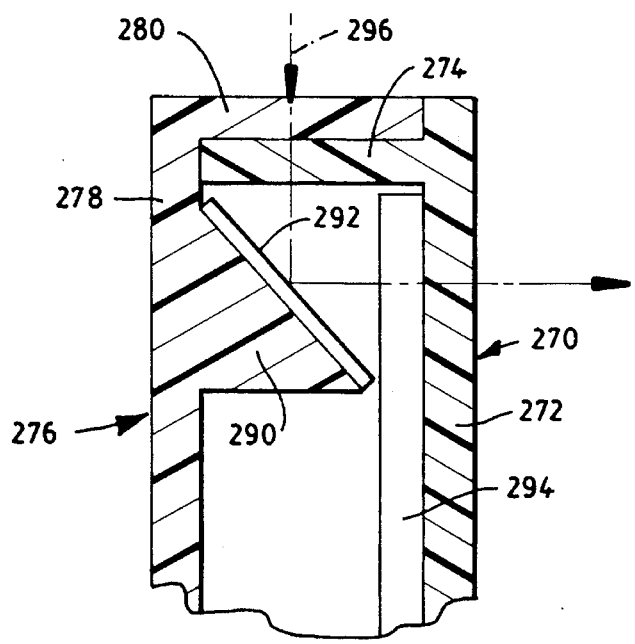
FIG. 19 is a diagrammatic cross-sectional elevational view of another embodiment of the invention employing a plane mirror surface to provide a folded path of observation.

FIG. 19 shows how a plane mirrored surface may be beneficially employed to practice the invention. A rear base 270 comprises a flat panel 272 having a raised edge 274, and a front cover 276 is provided with a flat panel 278 and raised edge 280. Integrally formed with flat panel 278 is a triangular shaped prismatic section 290 having a mirrored front surface 292 that may be placed on prismatic section 290 as a separate element or formed thereon by well-known coating techniques. Mirror surface 292 operates in a well-known manner to provide folded optical path 296 between edges 274 and 280 and card 294.

While a number of different embodiments have been shown for providing folded paths of observation to permit information to be seen through edges of compact disc box systems, it should be dear that different embodiments may be used simultaneously to gain benefit over conventional designs. In addition, the various embodiments, while illustrated in connection with the solution of a particular problem associated with CD containers, are equally applicable to other flat containers which employ clear plastic cases or at least have edges having a clear plastic portion. Examples that come to mind include boxes for video and audio cassettes.

Moreover, it should be realized that, while CD boxes are formed primarily of clear plastic, it is not necessary for the entire box to be of clear plastic. At the minimum what is needed is an edge which has at least a portion of it formed of transparent plastic to act as a window into a box. That the entire box or substantially all of it is formed of a clear plastic has the benefit of providing more light for illumination of the interior of a box and thus of any information it contains.

It should be apparent to those skilled in the art that the invention may be employed in compact disc storage boxes configured to receive stacks of discs; the optical means of the invention being provided on the outboard edges to read information contained in spaces between discs.

Finally, the descriptions of the information carrying elements of a compact box system has been confined to cards or booklets on which various textual or graphical material has been printed. It should be realized that the graphical or textual information may be printed on transparent material as well as paper bases and also can be formed directly on the flat surfaces of the front cover or base or other parts by hot stamping, painting, silk screening, labeling, or the like, and such forms of providing the necessary information may also be placed on exterior surfaces of a box. Labels may also be placed on or near the exit facets of the various prisms disclosed.

Those skilled in the art may make other changes to the invention without departing from the scope of its teachings. Therefore, it is intended that the embodiments described herein be considered as illustrative and not be construed in a limiting sense.

What is claimed is:

1. A box system for containing at least one compact disc, said box system comprising:

a flat base comprising a first flat panel having shallow raised side walls connected around the peripheral edges thereof;

a flat front cover comprising a second flat panel also having shallow raised side walls connected around the peripheral edges thereof, said flat front cover and said flat base being pivotally connected to one another to form a hinge between them so that they can be moved between a closed position in which they fit together to define an interior chamber therebetween for releasably receiving a compact disc, at least one of said shallow raised side walls of said flat base and said flat front cover having a window section through which an observer can look;

information providing means disposed within said interior chamber for providing information that is in a plane substantially parallel to one of said first and second flat panels;

a compact disc holder located in said flat base and extending between said shallow raised side walls thereof; and optical means located on said compact disc holder for providing at least one folded optical path between said window section of said shallow raised side walls of said flat base and said flat front cover and said information providing means so that an observer looking at said window section can see information disposed on said information providing means.

2. The box system of claim 1 wherein said optical means and said compact disc holder are molded as a unitary piece of transparent plastic.

3. The box system of claim 2 wherein said information providing means comprises a flat printed insert that overlies said first flat panel of said flat base and includes an edge portion adjacent said hinge and wherein said optical means is positioned adjacent along said hinge to provide said folded optical path between said hinge and said edge portion of said flat printed insert adjacent said edge portion.

4. A box system for containing at least one flat object and providing visual information about the flat object, said box system comprising:

a multisided flat box comprising a pair of opposed flat walls interconnected by a plurality of shallow side wails to provide an interior chamber for the flat object, said pair of opposed flat walls and said plurality of shallow side walls being joined to releasably receive the flat object, said shallow side wails including at least one window section through which an observer can look;

information providing means insertable into said interior chamber and located in a plane substantially parallel to one of said pair of opposed flat walls of said multisided flat box;

optical means located inside of said interior chamber for providing a plurality of folded optical paths between said window section and said information providing means so that an observer looking at said window section from different angular perspectives can see distinctly different information that is spatially separated on said information providing means, said optical means providing a plurality of folded optical paths whose initial branches ail lie sub stantiaily in a plane perpendicular to the major dimensions of said opposed flat walls and are and angularly separated in said perpendicular plane and whose final branches lie in different planes that are substantially parallel to said shallow side walls.

5. The box system of claim 4 wherein said optical means comprises a pair of prisms having entrance and exit facets and located with their respective said entrance facets perpendicular to said opposed flat walls and their respective said exit facets located in a plane parallel to said opposed flat walls such that one of said folded optical paths is provided by total internal reflection of one of said prisms and another of said folded optical paths is provided by both of said prisms, one of which operates in refraction and the other by total internal reflection.

* * * * *